United States Patent Office 2,967,153
Patented Jan. 3, 1961

2,967,153

SOLID DESICCANT

Harry H. Houston, Elmhurst, Ill., assignor to International Minerals & Chemical Corporation, a corporation of New York No Drawing. Filed Dec. 27, 1956, Ser. No. 630,753

16 Claims. (Cl. 252—194)

This invention relates to a solid desiccant material and a process for manufacturing it. More particularly, this invention relates to the composition of and the method of producing a solid desiccant material comprised of expanded perlite and a hygroscopic material.

The drying of gases or organic vapors may be accomplished with various desiccants which are commercially available. Such desiccants may be either liquid or solid materials. Liquid desiccants are usually used in continuous processes where the gas to be dried is passed through a spray tower countercurrent to the spray of liquid desiccant. Sulfuric acid, lithium chloride, and certain organic solutions such as ethylene glycol have been found to be suitable liquid desiccants in this type of drying operation.

Solid desiccants such as silica gel, activated alumina, sodium hydroxide and calcium chloride are generally used in intermittent drying operations. A light weight solid desiccant is preferred for use in drying towers and the like, since the desiccant trays, tower, and tower support may then be constructed of lighter and less expensive materials of construction.

Perlite particles which have been expanded at a temperature of the order of about 1500 to 2100° F. have a low weight per unit of volume, of the order of from about 5 to 25 pounds per cubic foot. The expanded perlite particles are porous and have a high surface area per unit of mass. Expanded perlite solids are relatively inert, and are not suitable as produced, as a desiccant material since they do not readily absorb moisture from the atmosphere. However, when expanded perlite solids are contacted with an aqueous liquid medium, the liquid is readily adsorbed by capillary action into the pores of the solids. Since the solids are not wetted by the liquid, the liquid adsorbed in the pores may be readily removed by heating.

It is an object of the present invention to provide a novel light-weight solid desiccant.

It is an object of the present invention to provide a novel method of producing a light-weight solid desiccant.

Still another object is to provide an improved solid desiccant comprised of expanded perlite particles and a hygroscopic material.

Another object is to provide a method of producing an improved solid desiccant comprised of expanded perlite particles and a hygroscopic material.

These and other objects and advantages of the invention will appear in the following detailed description thereof.

It has been discovered that a light-weight solid desiccant can be prepared by depositing a hygroscopic material from an aqueous medium on the surface of expanded perlite particles and heating the mixture of expanded perlite, hygroscopic material and water to dryness.

Expanded perlite particles suitable for use as a component of the light-weight desiccant is preferably produced from perlite ore having a mesh size less than about 30 mesh. Perlite ore is mined, subjected to a crushing operation, and sized at about 30 mesh. The coarse perlite ore is suitable for use as an aggregate in plaster and concrete. The fine particles, having a mesh size of about −30 mesh, are expanded at temperatures in the range between about 1500 and about 2100° F. Vertical shaft furnace and other types of conventional expansion furnaces used in the perlite industry are used to accomplish this operation. The expanded perlite may be abraded and sized at about 50 microns. The coarse comminuted expanded perlite, having a mesh size of the order of about −80 mesh +20 microns, is suitable for use as a filter aid and as a light weight aggregate in concrete, plaster, and the like. The coarse expanded perlite after comminution has a bulk weight of the order of about 5 pounds per cubic foot.

Fine expanded and comminuted perlite, having a mesh size of the order of about −200 mesh to +5 microns is suitable for use as a filter aid in operations where high clarity is desired and low filtration rate is permissible. The fine expanded comminuted perlite has not been used extensively as a filter aid because of its low filtration rate. Such material has a bulk weight of the order of about 4 pounds per cubic foot. From an economic standpoint, these fine expanded comminuted perlite particles are now found to be useful as components of light-weight solid desiccants although particles as large as about 30 mesh will also give satisfactory results.

Expanded comminuted perlite is not readily wetted by water and will adsorb a relatively small amount of moisture from the atmosphere. However, when such material is treated with a hygroscopic material, and contacted with a moisture laden atmosphere, the water removed from the atmosphere by the hygroscopic material is readily adsorbed into the pores of the expanded comminuted perlite. As a result of this combination of materials, the water sorption power of the hygroscopic material is greatly enhanced.

Hygroscopic materials suitable for depositing on the surface and in the pores of expanded comminuted perlite include sulfuric acid, calcium chloride, sodium hydroxide, potassium hydroxide, phosphoric acid, anhydrous $P_2O_5$, lime, calcium sulfate, and magnesium oxide. Other inorganic hygroscopic materials such as lithium chloride and organic hygroscopic materials such as diethylene glycol and triethylene glycol may also be used. Mixtures of two or more of these hygroscopic materials, where they are inert to each other, are also useful.

The expanded comminuted perlite particles and hygroscopic material are mixed in amounts equivalent to between about 0.11 and about 4 parts of perlite per part of hygroscopic material by weight on a dry basis. Preferably the weight ratio is between about 0.44 and about 2.3 parts of perlite per part of hygroscopic material. When the weight ratio is less than about 0.11, there is not a substantial reduction in the bulk weight of the solid desiccant, and when the weight ratio is greater than about 4, the water sorption power of the hygroscopic material is not substantially improved.

Hygroscopic material and expanded comminuted perlite are contacted in an aqueous medium in order to obtain maximum distribution of the hygroscopic material on the surface of the perlite fragments. Hygroscopic materials are added to the expanded comminuted perlite in the form of a liquid, slurry, or finely divided solid, depending upon the nature of the hygroscopic material. For example, sulfuric acid and phosphoric acid, or mixtures of the two, may be added as concentrated solutions either with or without water being present. Calcium chloride, potassium hydroxide, and sodium hydroxide may be added as aqueous solutions or as an aqueous slurry. Lime and magnesium oxide may be added as an aqueous slurry or in solid form. When a water insoluble hygroscopic material is added, either as a slurry or as a dry solid, the size of the particles is preferably less than about 200 mesh in order to obtain maximum distribution of the hygroscopic material on the surface of the perlite fragments. If the hygroscopic material is initially added as a dry solid to the perlite particles and mixed, then sufficient aqueous medium is subsequently added to the mixture of hygroscopic material and comminuted perlite to form a slurry having a water content between about 40% and about 80% by weight. If the hygroscopic material is added to the expanded perlite as a solution or slurry, sufficient water should be present in the resulting slurry to provide a water content of between about 40% and about 80% by weight. The water content of the mixture may be varied within the above-mentioned limits to produce a thick slurry that may be formed into discrete particles by granulation, pelletizing, extrusion and the like, which may be heated at temperatures in the range between about 90° and about 200° C. until substantially free of moisture, thus producing dried discrete particles suitable for use as solid desiccants.

Particle sizes of the solid desiccants may be varied to adapt them to the particular drying operation in which they are to be utilized. Granules of the solid desiccant having a mesh size of the order of about −4 mesh to +16 mesh are suitable for use in drying towers, although other granular sizes may be used. Pelletized desiccants, having dimensions on the order of 2″ diameter x ½″ thick, are suitable for removing moisture from the atmosphere in cabinets for analytical balances and other delicate mechanical equipment. Aqueous slurries of expanded comminuted perlite and hygroscopic materials may also be poured into pans or trays, heated as described above until substantially free of moisture to form porous slabs or plates of desiccant material. The solid slabs may be broken into particles of desired mesh size or cut into desired shapes.

In another embodiment of the invention, expanded comminuted perlite is formed into porous aggregates prior to mixing with the hygroscopic material. Aggregates are prepared by admixing expanded comminuted perlite with a binder such as boron phosphate, calcium metaphosphate, tricalcium phosphate, and other glass-forming phosphate compounds, and sufficient water added to form a paste suitable for pelletizing. The solids are preferably mixed in the following amounts:

About 75 to 95% expanded perlite particles,
About 5 to 25% binder.

If desired, a filler material, for example, ferric oxide, aluminum oxide, magnesium oxide, clay, and the like, may be added in an amount up to about 15% by weight of the solids in the mixture.

Comminuted perlite is produced as described above and preferably has a mesh size between about −30 mesh and about +5 microns. Boron phosphate having a mesh size on the order of about −30 +325 mesh is preferably used as a binder, but other binding materials may be used. Finely divided ferric oxide is preferably used as a filler, but other substances such as aluminum oxide, magnesium oxide, clay, or mixtures thereof, may be used. A waste-product filter cake obtained in the acid activation of bentonite clay has been found to be a suitable filler. The filter cake has the following composition:

| Component: | Percent by weight |
|---|---|
| $SiO_2$ | 0.63 |
| $Fe_2O_3$ | 1.01 |
| $Al_2O_3$ | 1.53 |
| $MgO$ | 4.07 |
| Volatile at 105° C. | 77.8 |
| Loss on ignition @ 1000° F. | 93.0 |

The paste of expanded comminuted perlite, binder, water, and filler, if desired, is formed into pellets, and the pellets are heated at a temperature between about 90° and about 200° C. until substantially free of moisture. The dried pellets are fired at a temperature between about 1400 and about 1600° F., preferably at about 1500° F. for between about 15 and about 45 minutes. The pellets are cooled to a temperature less than about 60° C. and immersed in an aqueous solution or slurry of hygroscopic material, for example, an aqueous calcium chloride solution. After the pores of the pellets are saturated with the aqueous solution, the pellets are removed from the solution and heated at a temperature between about 90° C. and about 200° C. until substantially free of moisture. The light-weight solid desiccant prepared in this manner has substantially improved water sorption properties.

When a novel solid desiccant of the type described is contacted with an atmosphere containing moisture, a substantial increase in the amount of water sorbed from the atmosphere may be obtained per unit of weight of desiccant used, over previously known desiccants. Another advantage of the novel solid desiccant is that the spent solid desiccant can be regenerated by heating at a lower temperature than that necessary to regenerate previously known solid desiccants. For example, a solid desiccant comprised of expanded comminuted perlite fines and calcium chloride, produced as described above, may be reactivated by heating to about 200° F. for about 3 hours. On the other hand, solid desiccants such as alumina and silica gel must be reactivated at temperatures between about 350° F. and about 600° F. for the same length of time.

The novel solid desiccant has a bulk weight of the order of about 20 to about 40 pounds per cubic foot. Because of the light weight of the desiccant, a substantial reduction in the cost of drying tower equipment may be realized.

As illustrative of the character of the instant invention, but in nowise intending to be limited thereby, the following examples are described; all parts and percentages are by weight unless indicated otherwise.

EXAMPLE I

About 50 parts of expanded comminuted perlite fines having a mesh size less than about 200 mesh were intimately mixed with about 16.2 parts of $H_2SO_4$ and about 115 parts of water. The slurry was poured into a pan and heated at about 100° C. overnight. The slab of solid desiccant was removed from the pan and broken into discrete particles having a mesh size of about −4 +8 mesh. The particles were placed on an aluminum pan, weighed, and placed in a desiccator. The pan of porous desiccant was placed on a rack positioned above a saturated solution of potassium nitrate. The potassium nitrate solution was sufficient to maintain a relative humidity of about 40% at room temperature in the desiccator. At periodic intervals the tray of solid desiccant was removed from the desiccator, weighed, and returned to the desiccator. Water content of the novel desiccant in terms of percent of initial weight gained is presented in Table I.

Table 1

| Time of contact, hours: | Weight gain, percent |
|---|---|
| 2 | 2.2 |
| 4 | 4.4 |
| 6 | 6.5 |
| 24 | 35.5 |
| 288 | 74.0 |

EXAMPLE II

About 25 parts of expanded comminuted perlite having a mesh size less than about 200 mesh were intimately mixed with about 25 parts of calcium chloride in the form of an aqueous solution having a concentration of about 25% $CaCl_2$. Sufficient aqueous 50% $H_2SO_4$ solution was added to the slurry to adjust the pH of the slurry to about 3. The slurry was placed in a pan and heated at about 100° C. overnight. The slab of porous desiccant was crushed as in Example I, placed in a desiccator and tested as described in Example I. Water content of the novel desiccant in terms of percent of initial weight gained is presented in Table II.

Table II

| Time of contact, hours: | Weight gain, percent |
|---|---|
| 3 | 5.5 |
| 6 | 9.1 |
| 24 | 29.5 |
| 48 | 31.0 |
| 72 | 35.6 |

EXAMPLE III

About 10 parts of expanded comminuted perlite fines having a mesh size less than about 200 mesh were intimately mixed with about 30 parts of calcium chloride and about 45 parts of water. The mixture was pelletized to form a pellet having a diameter of about 2" and a height or thickness of about ½". The pellet was dried at a temperature of about 100° C. for about 8 hours. After cooling, the pellet was placed in the desiccator of Example I. Water content of the novel desiccant in terms of percent of initial weight gained is presented in Table III.

Table III

| Time of contact, hours: | Weight gain, percent |
|---|---|
| 1 | 1.7 |
| 2 | 3.5 |
| 3 | 5.2 |
| 4 | 6.2 |
| 5 | 7.5 |
| 7 | 9.8 |
| 24 | 28.8 |

EXAMPLE IV

About 25 parts of expanded comminuted perlite fines, having a mesh size less than about 200 mesh were intimately mixed with about 2 parts of boron phosphate and about 3 parts of filler. The filler was obtained by heating to dryness a waste product filter cake obtained in the acid activation of bentonite clay, said filter cake having the following composition:

| Component: | Percent |
|---|---|
| $Fe_2O_3$ | 1.01 |
| $SiO_2$ | 0.63 |
| $Al_2O_3$ | 1.53 |
| MgO | 4.07 |
| Volatile @ 105° C. | 77.8 |
| Loss on ignition at 1000° F. | 93.0 |

Sufficient water was added to form a paste, and the paste was formed into a pellet. The pellet was heated at about 90° C. until substantially free of moisture and was then placed in a furnace and heated to about 1500° F. for about 15 minutes. After cooling, the pellet was weighed and immersed in an aqueous solution of calcium chloride having a concentration of about 25% $CaCl_2$. After the pellet was saturated with the solution, it was removed from the solution and heated at about 100° C. until substantially free of moisture, resulting in the production of a pellet which upon cooling had a weight increase of about 23.6% over the weight of the pellet prior to contact with the calcium chloride solution. The pellet, having a dimension of about 2" diameter x ½" thick, was very rigid, highly porous and had an apparent density of about 32.5 pounds per cubic foot. The pellet was placed in the desiccator of Example I. Water content of the pellet in terms of percent of initial weight gained is shown in Table IV.

Table IV

| Time of contact, hours: | Weight gain, percent |
|---|---|
| 2 | 6.4 |
| 3 | 10.6 |
| 4 | 12.2 |
| 5 | 15.4 |
| 7 | 19.4 |
| 24 | 43.2 |

After absorbing the water as above shown, the pellet was removed from the desiccator and heated at about 200° C. until substantially moisture free. It was cooled and placed again in the desiccator of Example I, exhibiting water sorption powers substantially the same as the freshly prepared pellet.

Having thus fully dscribed and illustrated the invention, what is desired to be secured by Letters Patent is:

1. A substantially anhydrous light-weight solid desiccant suitable for the drying of moisture-containing gases comprised of comminuted particles of expanded perlite and a hygroscopic material deposited on the surface and absorbed in the pores thereof.

2. The light-weight solid desiccant of claim 1, where the comminuted particles of expanded perlite have an average particle size less than about 200 mesh.

3. The light-weight solid desiccant of claim 1, where the hygroscopic material is calcium chloride.

4. The light-weight solid desiccant of claim 1, where the hygroscopic material is sulfuric acid.

5. The light-weight solid desiccant of claim 1, where the comminuted particles of expanded perlite are present in an amount equivalent to between about 0.11 and about 4 parts by weight of perlite per part of hygroscopic material.

6. The process of preparing a light-weight solid desiccant suitable for the drying of moisture-containing gases which comprises the steps of mixing comminuted particles of expanded perlite, a hygroscopic material, and water and heating the mixture to a temperature of between about 90° C. and about 200° C. until substantially free of water whereby said hygroscopic material is deposited on the surface and in the pores of said particles.

7. The process of claim 6 in which the slurry is formed into discrete particles prior to heating.

8. The process of claim 6 where the light-weight solid desiccant is formed into discrete particles subsequent to the heating step.

9. The process of claim 6 where the comminuted particles of expanded perlite have an average mesh size less than about 200 mesh.

10. The process of claim 6 where the hygroscopic material is calcium chloride.

11. The process of claim 6 where the comminuted particles of expanded perlite and hygroscopic material are mixed in an amount equivalent to between about 0.11 and about 4 parts by weight of expanded comminuted perlite per part of hygroscopic material.

12. The process of preparing a light-weight solid desiccant suitable for the drying of moisture-containing gases which comprises the steps of admixing comminuted particles of expanded perlite, a binder, and water, pelletizing the mixture, heating the pellets until substantially free of moisture, firing the pellets to a temperature between about 1400 and about 1600° F., whereby rigid porous pellets are produced cooling the pellets, depositing a hygroscopic material on the surface and in the pores of said pellets by immersing the pellets in an aqueous solution of a hygroscopic material, and heating the pellets until substantially free of moisture.

13. The process of claim 12 where said expanded perlite and binder are mixed in the amounts between about 75% and about 95% expanded perlite, and between about 5% and about 25% binder, by weight.

14. The process of claim 12 where the binder is boron phosphate.

15. The process of claim 12 where the hygroscopic material is calcium chloride.

16. The process of preparing a light-weight solid desiccant which comprises the steps of admixing comminuted particles of expanded perlite, a binder and water, pelletizing the mixture, heating the pellets until substantially free of moisture, firing the pellets to a temperature between about 1400 and about 1600° F., whereby rigid porous pellets are produced, cooling the pellets, depositing a hygroscopic material on the surface and in the pores of said pellets to provide a weight ratio of expanded comminuted perlite to hygroscopic material of between about 0.11:1 and about 4:1 by immersing the pellets in an aqueous solution of a hygroscopic material, and heating the pellets until substantially free of moisture.

References Cited in the file of this patent

UNITED STATES PATENTS

| | | |
|---|---|---|
| 1,425,790 | Moyer | Aug. 15, 1922 |
| 1,482,626 | Whiting | Feb. 5, 1924 |
| 1,972,390 | Miner | Sept. 4, 1934 |
| 2,209,163 | Kaloustian | July 23, 1940 |
| 2,284,981 | Martin | June 2, 1942 |
| 2,356,890 | Schultz | Aug. 29, 1944 |
| 2,517,235 | Pierce | Aug. 1, 1950 |
| 2,531,975 | Essex | Nov. 28, 1950 |
| 2,600,812 | Thomas | June 17, 1952 |
| 2,650,202 | Hawes et al. | Aug. 25, 1953 |
| 2,665,813 | Bollaert et al. | Jan. 12, 1954 |

OTHER REFERENCES

Information Circular 7364, U.S. Dept. of Interior, Bureau of Mines, August 1946, page 8.